Figure 1:
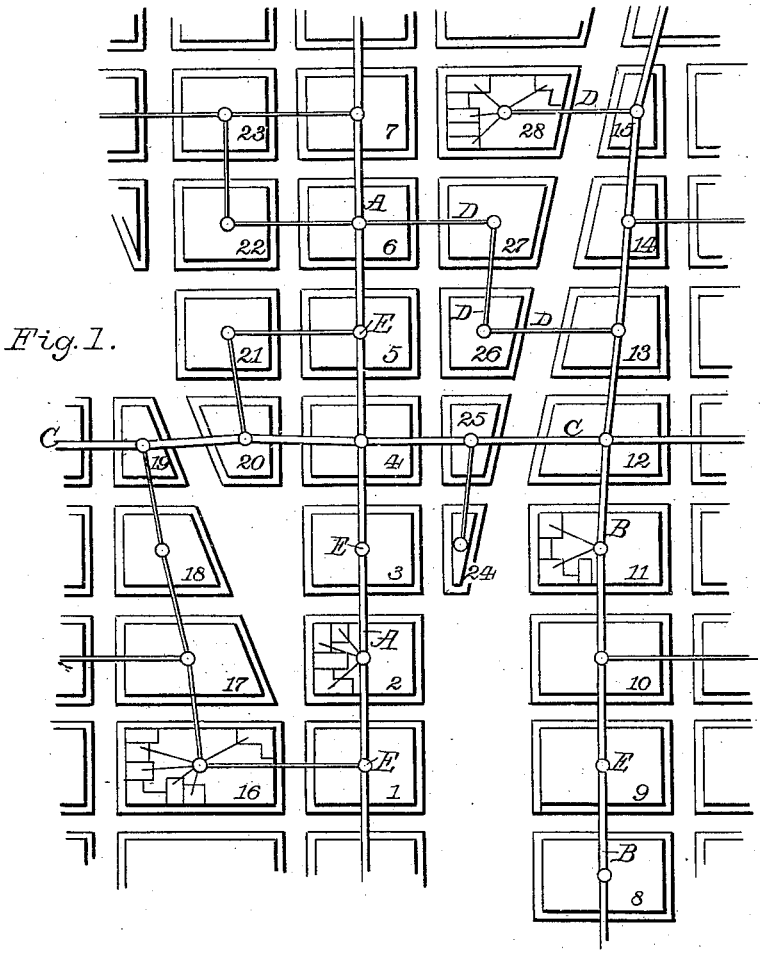

(No Model.) 2 Sheets—Sheet 1.

J. E. HAMILTON.
UNDERGROUND SYSTEM OF LAYING ELECTRICAL CONDUCTORS.

No. 279,646. Patented June 19, 1883.

Attest:
Philip F. Larner.
Howell Bartle.

Inventor:
James E. Hamilton.
By Wm. C. Wood
Attorney.

(No Model.) 2 Sheets—Sheet 2.
J. E. HAMILTON.
UNDERGROUND SYSTEM OF LAYING ELECTRICAL CONDUCTORS.
No. 279,646. Patented June 19, 1883.
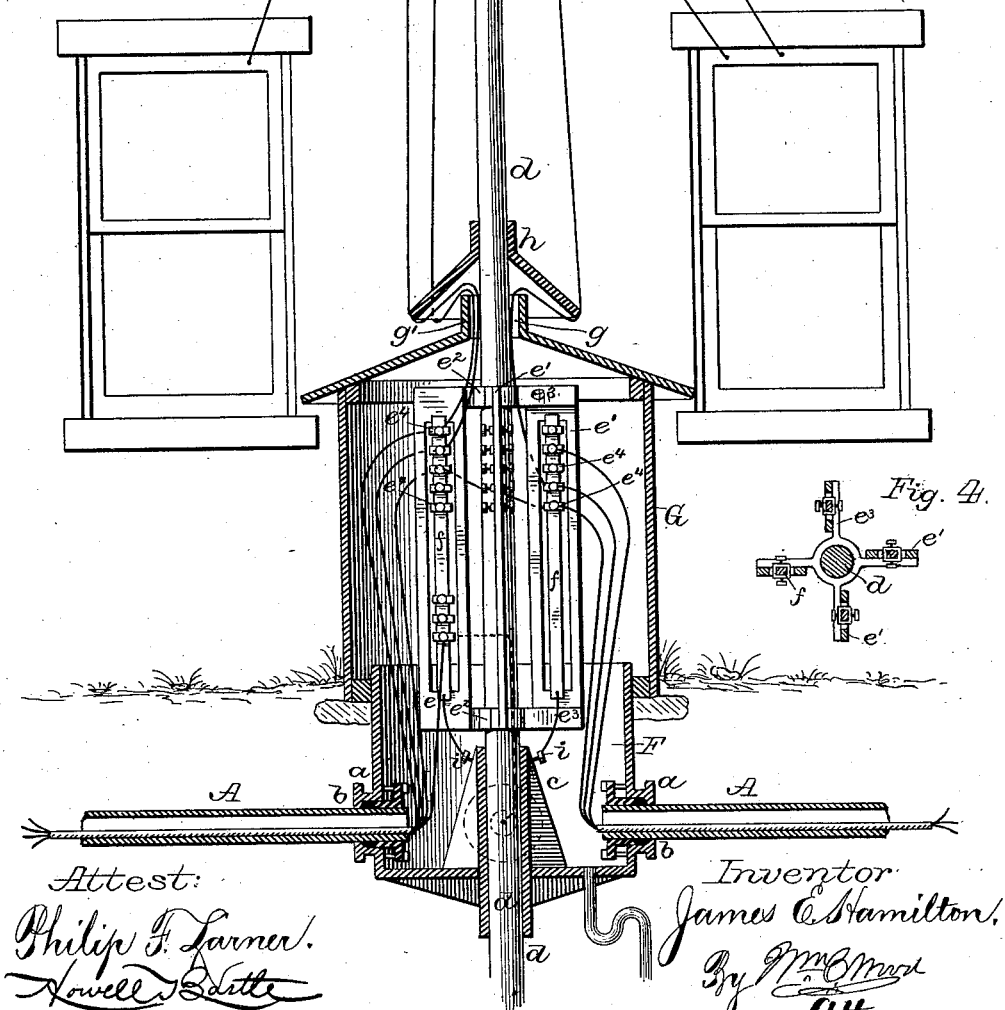

UNITED STATES PATENT OFFICE.

JAMES E. HAMILTON, OF NEW YORK, N. Y.

UNDERGROUND SYSTEM OF LAYING ELECTRICAL CONDUCTORS.

SPECIFICATION forming part of Letters Patent No. 279,646, dated June 19, 1883.

Application filed April 2, 1883. (No model.)

*To all whom it may concern:*

Be it known that I, JAMES E. HAMILTON, of the city, county, and State of New York, have invented certain new and useful Improvements in Underground Systems of Laying and Working Electrical Conductors in Cities, and in Switch Houses and Wells employed therein; and I do hereby declare that the following specification, taken in connection with the drawings furnished and forming a part thereof, is a clear, true, and complete description of my invention.

By the practice of the main feature of my invention I of course seek to obviate the objectionable street wires, poles, fixtures, and roof-work incident to aerial systems; and in that connection I can accomplish only what is possible under various prior underground systems. So far as my knowledge extends, all prior underground systems, as applied or proposed to be applied in cities, necessarily involve the extensive tearing up of streets or sidewalks, because the massed wires or wireways occupy positions beneath and lengthwise of the streets or sidewalks; but I have reduced the objectionable street-work to a minimum by providing for the planting of massed wires in such a manner that they need only occupy positions beneath and crosswise of streets and sidewalks, thus in most cases enabling the laying of pipes for the reception of wires by tunneling beneath a streetway from sidewalk to sidewalk, or from cellars on one side of the street to those on the opposite side. In other words, I traverse blocks or squares with massed wires at any proper depth, thus requiring only the crossing of streets laterally, as distinguished from occupying them longitudinally. For distributing connections within a block or square, I radiate more or less of the massed wires from a central position in the block, and although that method of local distribution is not broadly new, it has only been proposed in connection with massed wires lying longitudinally with the streets and below the carriage-pavements or the sidewalks, and the wires for distribution within a block were diverted from the main mass of wires at adjacent street-intersections, and entered each block diagonally at one corner thereof, and, as compared with said prior systems, I am not only generally able to wholly avoid tearing up the streets and sidewalks, but always avoid tearing them up longitudinally, and I am, in addition thereto, enabled to plant wires and wireways for a given area in a town or city at less cost in laying and with greater economy in the length of conductors used. This method of planting wires is thoroughly applicable to long-distance service between remote points—as, for instance, in passing directly through the whole or any part of a town or city—as well as for local distribution; and in all cases the line-wires are conveniently accessible for variations, testing, and inspection by means of switch houses and wells in each block, and I have devised a switch house and well to be centrally located in each block, wherein ample provisions have been made for convenient connection and disconnection for through service, and also for local service on the same square or block, and for arranging grounding-circuits and induction-grounds, and also for the application of lightning-arresters; but it is to be understood that I am well aware that lightning-arresters have heretofore been applied to underground conductors, and that provisions have heretofore been made for directly grounding such conductors, as well as for induction-grounds. Certain novel features involved in the internal arrangements of my said switch house and well are equally useful in connection with massed wires or wireways planted in streets, as heretofore, in which case said switch-well can be located at the intersection of streets, or at other desirable points therein, and covered by a suitable plate provided with a man-hole and cover.

To more particularly describe my invention, I will refer to the accompanying drawings, in which—

Figure 3:
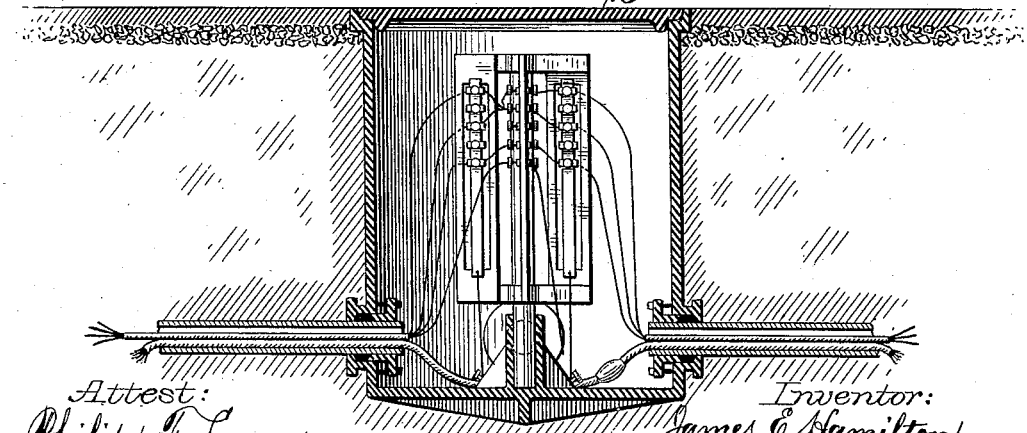

Figure 1 is a plan or diagram illustrating several city squares or blocks, the adjacent streets, the wireways, switch-houses, and the local distribution of wires within several of the squares. Fig. 2 is a vertical central section of one of my novel switch-houses and its well as arranged for location within a square. Fig. 3 is a vertical central section of my switch-well as arranged for location beneath a street or sidewalk. Fig. 4 is a transverse section of the wire-rack.

In Fig. 1 have illustrated my system as applied to, say, twenty-eight squares of a city or town, and it will be seen that it is immaterial how irregularly the streets may have been laid out, or whether the squares be uniform in shape or size or the streets wide or narrow.

A city map being provided, plans are first determined upon for running through or direct lines, reference being had to the shortest route between a home station and a remote point in the suburbs, as well as to the width and general character of the thoroughfares crossing said routes—as, for instance, the squares 1 to 7, inclusive, afford a direct route for the underground wireway A, containing massed wires; and the same is true of squares 8 to 15, inclusive, traversed by the underground wireway B; and a transverse direct route for wireway C is afforded through squares 19, 20, 4, 25, and 12; and each of these routes may also be occupied by wireways and wires for local distribution in each block thus traversed, and also by wires for extension to the squares on the one side or the other in any direction, as may be desired. It will thus be seen that the massed wires need never be planted in any street longitudinally therewith, and that wide streets can be generally avoided. The wires, in the form of cables or otherwise properly insulated and massed, are contained within the wireways or pipes, sunken to depths which can be almost indefinitely varied, according to the particular condition or lay of the ground occupied by each square or the character of the buildings thereon—as, for instance, in some squares the cellars of the buildings would be of less depth than in others, and in some cases, by reason of covered ways and alleys, only comparatively shallow excavations would be required therein, as well as at the interior unoccupied portions of the squares. In crossing streets the depth at which the wires are laid varies to correspond with the depth requisite at the adjacent side of each of the adjacent squares, and in most cases an excavation in each sidewalk on opposite sides of a street will enable the laying of a pipe in sections by the use of an excavating-drill having a sectional stem and operating horizontally, the pipe being forced forward, section after section, from the excavation within which the drill is operated.

It will be obvious that when right of way can be secured in cellars the wireway-pipe can be located at any desired level, either beneath a sub-cellar floor or along a side wall. At whatever the depth the wireways may be planted, they should be provided with water-tight joints for obtaining the best results, and their internal dimensions will be varied according to whether they are limited—like those, for instance, at D, leading to and from squares 26, 27, and 28—to local service, or designed for combined local and through service, as at A in squares 1 to 7, inclusive. The switch-houses E, located more or less centrally in each square, may be variously constructed in accordance with the main feature of my invention; but each is essentially provided with a water-tight well, into which the wireway-pipes enter—one, two, three, or four, as the case may be—with provisions for water-tight joints. Through-wires may be directly spliced at each switch-house, if desired, or connected by way of screw-posts, in a manner well known. Wires for local distribution on the square are connected by screw-posts, and suspended from the top of a pole rising from the switch-house and stretched to the particular premises to be supplied. The arrangement or system thus far described is novel, in that it involves the use of a novel combination of wireway-wells and underground wireways which underlie city blocks or squares and transversely underlie intervening streets or roadways in extending from block to block, and substantially said combination and arrangement constitutes the main feature of my invention.

I will next describe my novel switch house and well, as illustrated in Fig. 2.

The well F varies in depth according to circumstances, and it may be composed of brick tightly cemented; but I prefer to construct the same of wrought or cast iron, with suitable coupling-connections, as at $a$, for the reception of the ends $b$ of the wireway-pipes A, and to provide for longitudinal contraction and expansion, and to obtain a water-tight joint at said connections a gland and suitable packing may be used to advantage. The bottom of the well should be considerably lower than the level of the communicating wireways, and a properly-trapped drain-pipe should communicate with an adjacent sewer or drain to provide against accidental flowage of surface-water. The bottom of the well is provided with a central vertical base-block, $c$, of cast-iron, and having radial angular webs, the whole serving as a grounding-base, and it is vertically perforated for the reception of the foot of the staff or pole $d$, which may be composed of wood or tubular iron, and preferably extended through the bottom of the well into the ground to secure a firm support. Upon the pole $d$, extending upward from the iron base $c$, is a wire-rack, $e$, having as many radially-projecting wings $e'$ as there are wireway-pipes, each wing being on the side of the pole adjacent to its particular wireway. These radial wings are maintained in position by being connected to the pole by means of an upper and a lower ring or collar, $e^2$, having radial arms $e^3$, to which, to form each wing, two vertical bars of suitable material, preferably wood saturated with paraffine, are secured at top and bottom, as clearly indicated. The wire rack wings are each provided in a vertical row with a series of plates or collars, $e^4$, each having a pair of screw-posts or equivalent coupling devices, and each series of plates or collars is in proper connection with a lightning-arrester, $f$, grounded at its base with or to the iron base

*c*. In some cases a tower will be desirable for local distribution, in lieu of the pole.

The well F is surmounted by the switch-house, G, preferably cylindrical in form, and provided with a suitable door. The pole *d* extends upward through the roof, and to provide against racking the switch-house from the inevitable swaying of the pole, and for the passage of wires for local service, the aperture at *g* is considerably larger than the pole. For housing said aperture from the weather, a pendent hollow conical cap, *h*, is firmly secured to the pole above the roof, and its lower edge extends to near the surface of the roof, thus practically inclosing the aperture *g*. For properly leading the wires from the aperture *g* to the cross-bars at the top of the pole, a vertical cylindrical sleeve, *g'*, is provided at said aperture, having its upper edge extended considerably above the plane occupied by the lower edge of the cap *h*, thus enabling the wires to be drawn downwardly over the top of the sleeve to and beneath the edge of said cap, and thence directly upward, as clearly indicated in the drawings. From the top of the pole the wires are extended to the rear of such buildings in that block as are to be supplied.

It will be seen that any of the wires leading from either of the entering wireways may be coupled directly or by means of switch-cords or bridles through the wire-racks with wires in either of the other wireways, or, being properly insulated, they can, if desired, be directly spliced and occupy the bottom of the well. It will also be seen that either of the lightning-arresters *f*, with its collars or plates and screw-posts, is available for use by any or all of the wires in any two or more of the ways; but I deem it preferable to employ as many arresters as there are wireways. The construction and arrangement of the lightning-arresters can obviously be widely varied without materially affecting the desired results.

It is obvious that the radial wire-rack affords convenient access to all of the wires connected thereby, and that changes in connection can be readily made, and that testing from block to block can readily be accomplished. The grounding of any of the wires is conveniently made at the screw-posts *i* in the base to which the lightning-arresters are electrically connected. In the use of that class of cables requiring induction-grounds their foil-jackets are electrically connected with the grounding-posts *i*. The conductors for all varieties of electrical apparatus known to me can be properly distributed and arranged for service with grounded or metallic circuits, as required, by means of the underground wireways, switch-houses, and wells described. The original introduction of wires and cables into the wireways can be effected by means of draft wires or cords initially laid therein during the planting of the wireways, although in many cases cables properly tipped at their ends can be forced longitudinally from one well to the next, care having been taken to provide for smooth internal joints in the wireways. Through-cables of very considerable length can be laid without splicing at the switch-wells, if desired, if the draft lines or wires at each well are used on the one cable, thus enabling any requisite number of men to be simultaneously employed in depositing a long cable in the wireways. Cables having induction-conductors or foil-jackets, when once properly located in the wireways, can have said jackets grounded at each well, thus enabling the foil-jackets to perform their maximum service.

In Fig. 3 the well is aranged for use without the elevated distributing-pole beneath a streetway or sidewalk. For this service the well should be of sufficient depth to enable the location of the top of the wire-rack below the cap-plate *k*, and the grounding-block is of less height than in the previously-described well, and when the well has a non-metallic bottom said grounding-base should have a central tubular or solid spindle extending through the bottom of the well into the earth below, as clearly indicated in Fig. 2.

Having thus described my invention, I claim as new and desire to secure by Letters Patent—

1. The combination, substantially as hereinbefore described, of a series of wireway-wells and switch-houses centrally located in city blocks or squares, and a system or series of underground wireways traversing said blocks or squares, communicating with and radiating from said wells, and transversely underlying intervening streets or roadways in extending from block to block, as set forth.

2. The combination, with underground wireways, of a switch-house, well, radial wire-rack, pole, and metal base, substantially as described.

3. The combination, with underground wireways, a well with which said wireways communicate, a wire-rack for switching and for coupling the conducting-wires from one wireway with those of another, and a lightning-arrester available to all or any portion of the conducting-wires from either or all of the wireways, substantially as described.

4. The combination of the switch-house, the pole rising centrally therefrom, and the pendent cap mounted on said pole, substantially as described.

5. The combination, with the underground wireways, of a well, a wire-rack for coupling and switching, and a metal base-block serving as a support for the wire-rack, and also as a grounding-base, substantially as described.

JAMES E. HAMILTON.

Witnesses:
C. H. MACHIN,
C. E. HAMILTON.